United States Patent [19]
Wolf

[11] Patent Number: 5,838,321
[45] Date of Patent: Nov. 17, 1998

[54] USER INTERFACE WITH EMBEDDED OBJECTS FOR PERSONAL COMPUTERS AND THE LIKE

[75] Inventor: Richard James Wolf, Crowley, Tex.

[73] Assignee: AST Research, Inc., Irvine, Calif.

[21] Appl. No.: 643,577

[22] Filed: May 6, 1996

[51] Int. Cl.[6] .................................................... G06F 3/00
[52] U.S. Cl. .......................................................... 345/343
[58] Field of Search .................................. 345/333, 334, 345/339, 340, 343, 345, 347

[56] References Cited

U.S. PATENT DOCUMENTS

| | | | |
|---|---|---|---|
| 4,845,644 | 7/1989 | Anthias et al. ........................ | 345/343 |
| 5,530,865 | 6/1996 | Owens et al. .......................... | 395/680 |
| 5,699,535 | 12/1997 | Amro ..................................... | 345/342 |
| 5,721,853 | 2/1997 | Smith ..................................... | 345/353 |

OTHER PUBLICATIONS

Don Hopkins, *The Design And Implementation of Pie Menus*, Dec. 1991, pp. 16–18, 20–26 and 94.

Primary Examiner—A. Katbab
Attorney, Agent, or Firm—Knobbe, Martens, Olson & Bear, LLP

[57] ABSTRACT

A user interface with embedded or linked objects is enclosed. In one embodiment, the invention comprises a computer program, operating with a GUI and capable of linking or embedding an object from an application program into the GUI. The program includes instructions for determining a size of the object, instructions for determining whether the object is in an active mode, instructions for providing a first frame size of a container if the object is not in the active mode, and instructions for providing a second frame size if the object is in the active mode. The frame can simply represent the size of the container or an actual border around the container. The computer program also provides a first client window that is responsive to whether or not the object is active. Furthermore, the computer program adjusts the location of the object on the display when the object is in the active mode, provides space for controls of the objects server application, and provides appropriate pop-up menus for the object.

31 Claims, 5 Drawing Sheets

USER INTERFACE WITH EMBEDDED OBJECTS FOR PERSONAL COMPUTERS AND THE LIKE

TECHNICAL FIELD

The invention relates generally to user interfaces for computers and, more particularly, to a system for incorporating embedded objects into a user interface.

BACKGROUND OF THE INVENTION

Graphical user interfaces, or "GUIs" as they are often designated, have become an increasingly common and popular feature of computers, especially personal computers (PCs). One of the many advantages of such GUIs is that they provide a quick and easy platform to display frequently used or required data by selecting and manipulating graphical display elements, such as icons, with a pointing device, such as a mouse. A mouse is an input device which, when moved over a surface, moves a mouse pointer across the computer display in a corresponding manner. Typically, a mouse has a button which when pressed, generates to the computer an input relating the user and the location of the mouse on the computer display. "Clicking" will be used herein to refer to the pressing and releasing of a mouse button, unless otherwise specified. The icons of a GUI are designed to behave in a manner similar to the objects they represent. The Apple Macintosh user interface, Microsoft Windows operating environment, and UNIX X-Windows are common and very popular examples of GUIs, illustrating the fact that the advantages of GUIs over conventional text-based user interfaces are widely recognized.

Clearly, GUIs significantly reduce the amount of information that a user must recall in order effectively to use the computer. For example, instead of having to remember the name of an application program and navigate by manual typing, the user can search files and launch applications in a more intuitive manner, such as by clicking on well organized buttons and icons. As a result of the ever-increasing popularity of GUIs, a variety of different means for organizing and navigating through the various application and other programs have been developed. One such navigational metaphor, hereinafter referred to as the "SPOT interface," is described in detail in commonly-assigned, copending U.S. application Ser. No. 08/431,280, filed Apr. 28, 1995, entitled USER INTERFACE FOR PERSONAL COMPUTER AND THE LIKE, now U.S. Pat. No. 5,521,853, which is hereby incorporated by reference in its entirety. In the above mentioned reference, the SPOT interface provides a small circular graphic display element ("GDE") for the user to select the interface. Once selected, four quadrants become available. Each quadrant may hold a unique application, such as a "Tools" application.

Various methods and apparatus currently exist for allowing a GUI to support many different applications. Furthermore, portions of data, or objects, can be shared between the different applications. For example, the Microsoft Windows interface can support a Microsoft Works spreadsheet application as well as a WordPerfect word processing application. Using Windows object linking and embedding ("OLE") capability, a selection of spreadsheet cells of a Microsoft Works spreadsheet can be placed inside a WordPerfect document. In this example, the Works spreadsheet is a "server" document, the selection of spreadsheet cells is an "object," and the WordPerfect document is a "container" document. The WordPerfect container document is a conventional document, except that it provides a "client" window for the object. As a result, the object is either linked or embedded into the container. When an object is linked from the server document to the container document, a user may edit the object by making changes to the server document. When the object is embedded from the server document to the container document, the user may edit the object inside the container document by accessing features of the server document's application.

One of the many unique features of the SPOT interface, as described in the referenced application, is that it is provides four readily accessible quadrants, each corresponding to a secondary interface. While the SPOT interface provides it with many advantages over previous navigational metaphors, the SPOT interface, as originally implemented, cannot function as a container for linked or embedded objects. This is due to a number of features of the OLE application that are incompatible with the SPOT interface.

The SPOT interface is designed to be as unobtrusive as possible, taking up very little space of a computer display. For this reason, the quadrants of the SPOT interface are designed to be as small as possible, while still displaying all necessary information. However, the OLE application expects containers to be comparatively large, taking up a significant portion of the display. A conventional OLE container has ample room for activation of tools and tool bars whenever the object located in the container becomes active, whereas a quadrant of the SPOT interface does not provide enough room for the tools and tool bars. In addition, a conventional OLE container supports horizontal, or pull-down, menus, which usually consume the entire width of the display, whereas a quadrant of the SPOT interface saves room by utilizing pop-up menus. Furthermore, a conventional OLE container provides sufficient room to accommodate the different sizes of an object when active or inactive, whereas the size of a quadrant of the SPOT interface is constantly minimized. Finally, a conventional OLE container allows an object to be "dropped" into it, without requiring a change in the size or location of the container, whereas a quadrant of the SPOT interface has to continual adjust its size to a minimum, as well as continually adjusting its position inside the SPOT interface.

Clearly, object linking and embedding would be beneficial for use in connection with any type of user interface, but would be especially useful in connection with GUIs such as the SPOT interface described above. Providing means by which a user can embed or link objects into a user interface such as the SPOT interface enables a greater use of the interface as well as increased marketability for the interface.

Therefore, what is needed is a mechanism for linking or embedding objects into a user interface like the SPOT interface.

SUMMARY OF THE INVENTION

The present invention, accordingly, provides a method and apparatus for embedding objects in a user interface. To this end, the invention comprises a computer program, operating with a GUI and capable of linking or embedding an object from an application program into the GUI. The program includes instructions for determining a size of the object, instructions for determining whether the object is in an active state, instructions for providing a first frame size of a container if the object is not in the active state, and instructions for providing a second frame size if the object is in the active state. The frame can simply represent the size of the container or an actual border around the container. The computer program also provides a first client window that is responsive to whether or not the object is active. Furthermore, the computer program adjusts the location of the object on the display when the object is in the active state, provides space for controls of the objects server application, and provides appropriate pop-up menus for the object.

A technical advantage achieved with the invention is that objects can be linked or embedded into a graphical user interface such as the SPOT interface.

Another technical advantage achieved with the invention is that it minimizes the size of a linked or embedded object, yet consistently displays the object's accompanying controls and object adornments.

Another technical advantage provides pop-up menus that have the same functionality as traditional, horizontal menus.

DETAILED DESCRIPTION OF THE PREFERRED EMBODIMENT

Figure 1:
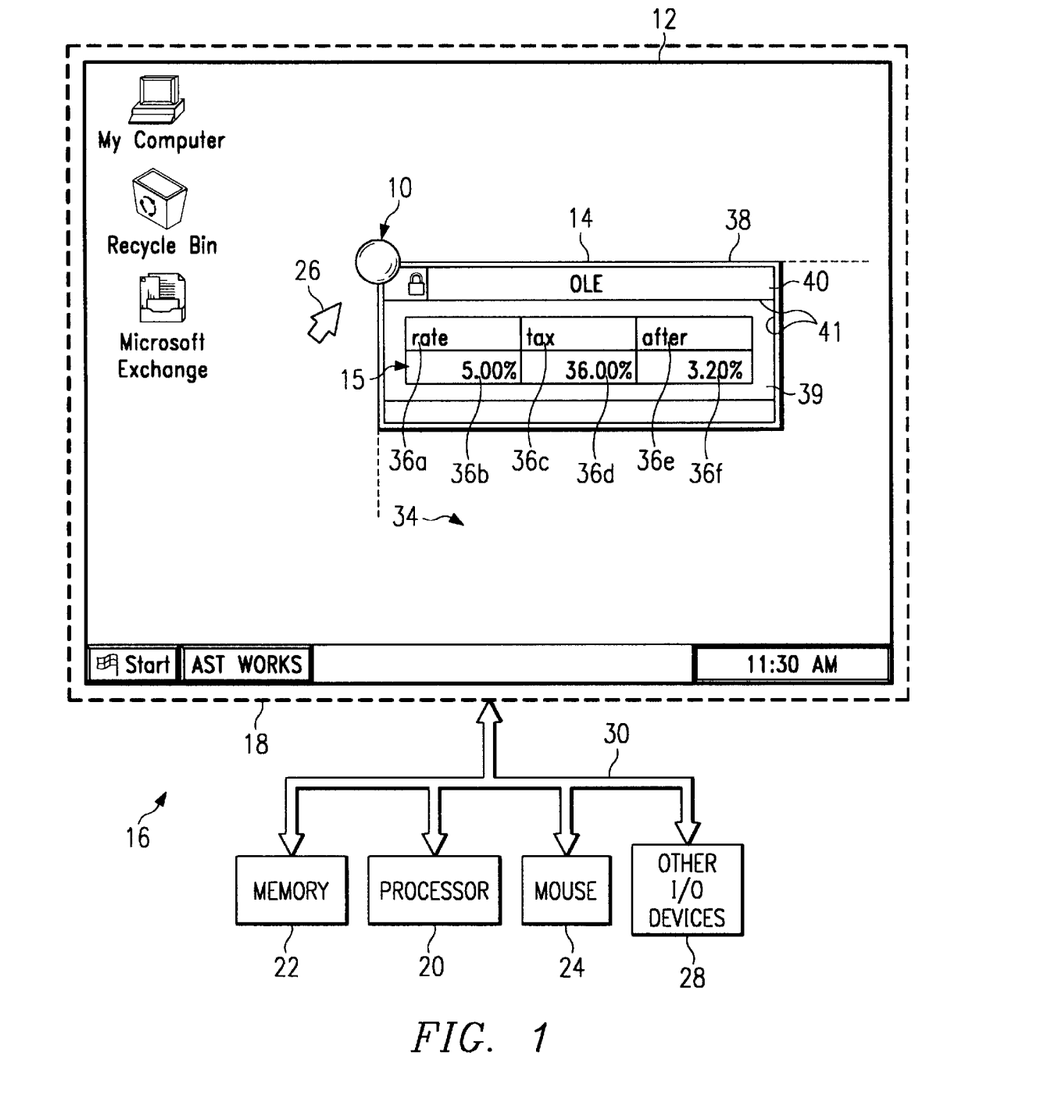
FIG. 1 is system block diagram of a computer for implementing the present invention.

Referring to FIG. 1, an interface system of the present invention, hereinafter referred to as a "SPOT interface," is shown in connection with a, SPOT graphical display element ("GDE") 10. In the preferred embodiment, the SPOT interface is overlaid on a window 12 of a graphical user interface (GUI). The window 12 is the main window of the Windows 95 GUI developed by Microsoft Corporation of Redmond, Wash. The SPOT GDE 10 is designed to float on top of the window 12 and all other open windows without obstructing much, if any, of the information displayed thereon. The SPOT interface, which may provide four quadrants, is shown with one quadrant 14 active. The quadrant 14 serves as a container for an object 15. Although the preferred embodiment of the present invention includes the use of the SPOT interface in connection with the Windows 95 GUI, it is anticipated that the object embedding system can be implemented in any number of different GUI operating systems and environments. It is understood that the object 15, the quadrant 14, the SPOT GDE 10 and the window 12 are generated by a PC 16 comprising a display 18, a central processing unit (CPU) 20, storage media 22, a mouse input device 24 for manipulating a mouse pointer 26 and other input/output ("I/O") devices 28, including a keyboard, interconnected in a conventional manner via a bus 30.

The preferred embodiment utilizes Microsoft's OLE2 system service program, referenced hereinafter as the "OLE service." In a conventional application, the OLE service is used to embed an object into traditional document oriented application containers, such as word processing applications. In these conventional applications, the object is part of a larger container such that there is ample space available within the container. As a result, the embedded object 15 may place additional controls and adornments within the container application so that the operation of the object can be effected within the space of the application container. Also, the conventional applications provide a horizontal pull-down menu for the container, which is available for the object as well.

In the example of the preferred embodiment shown in FIG. 1, the object 15 comprises six cells 36a, 36b, 36c, 36d, 36e, 36f of a spreadsheet produced by a Microsoft Works spreadsheet application, hereinafter referred to as the "Works application." It is understood, however, that objects can be from any application that meets the specifications of the GUI interface. Therefore, the six cells 36a–36f of the object 15 are merely exemplary of the many different possible objects that can be placed in the quadrant.

In operation, the quadrant 14 can be in one of two different configurations, depending on whether it is inactive or active. FIG. 1 illustrates the appearance of the object in "inactive mode." In inactive mode, the quadrant 14 includes the object 15, a frame 38, a border 39, a title bar 40, and a client window 41. The frame 38, border 39, title bar 40 and client window 41 are reduced to a small size, therefore allowing the quadrant 14 to be very small, and thereby as unobtrusive as possible. The six cells 36a–36f reflect data from the Works application that originally produced them. The frame 38 is the main window of the quadrant 14, and aesthetically separates the object 15 from the remaining desktop 12. The title bar 40 displays information related to the object 15. As a result, the object 15 looks like conventional secondary interfaces of the SPOT interface, while still retaining the functionality of conventional OLE service objects. The above described configuration of the quadrant 14 is accomplished by utilizing unique software instructions and subroutine calls, described in greater detail below, with reference to FIGS. 4–12.

Figure 2:
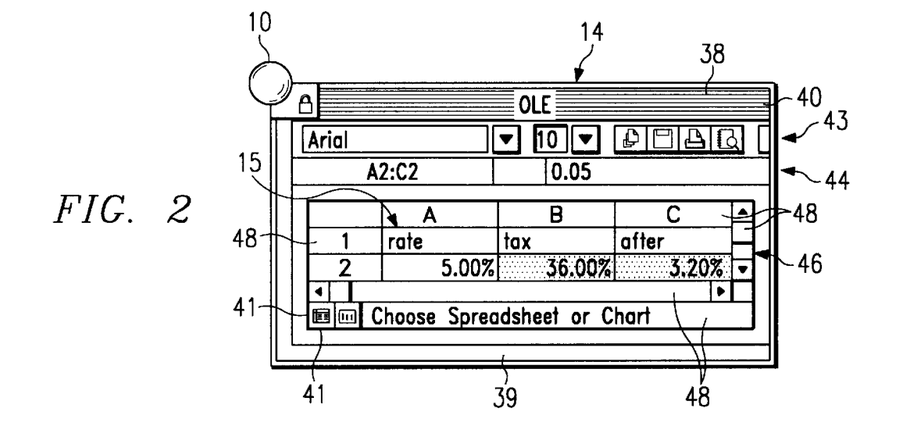
FIG. 2 illustrates an embedded object of FIG. 1 in an active state.

FIG. 2 illustrates the appearance of the object in "active mode." In active mode, the quadrant 14 comprises the object 15, the frame 38, the border 39, and the title bar 40, as in the inactive mode (FIG. 1). Although these features are shared between the active and inactive modes, their size and/or location will change with respect to the quadrant, depending on the mode, as will be discussed in greater detail below. In the active mode, the quadrant 14 also includes a plurality of worksheet controls, such as a tool bar 43 and information bar 44, a hatch window 46 that surrounds the client window 41 and indicates activation, and various object adornments of the Works application designated generally by a reference numeral 48 and including vertical and horizontal scroll bars, row and column headings, and a status bar.

Figure 3:
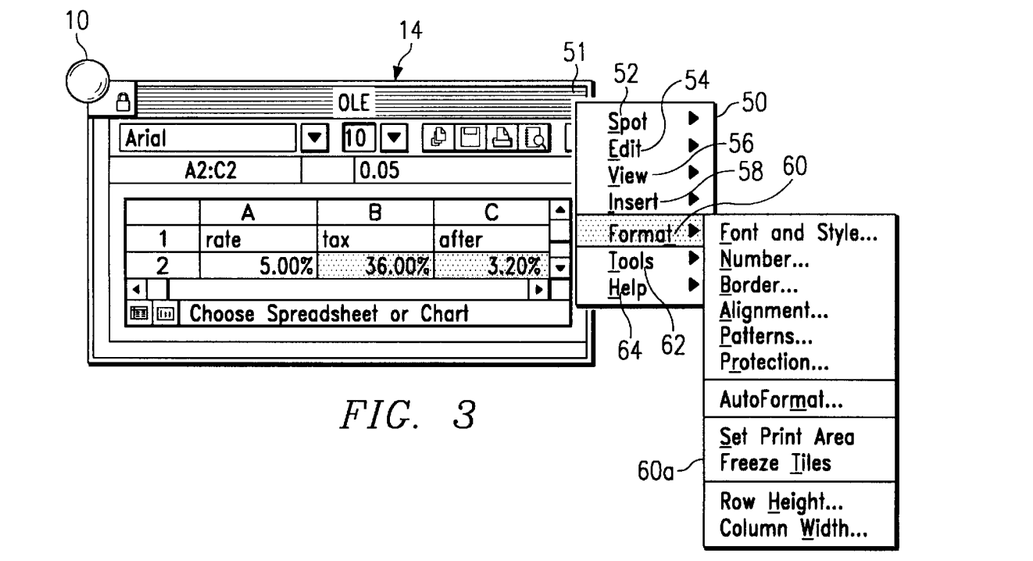
FIG. 3 illustrates the embedded object of FIG. 2, with a menu and sub.. menu selected.

Referring to FIG. 3, when the object is in active mode, the quadrant 14 also includes a plurality of pop-up menus. A quadrant system menu 50 serves as a main Windows menu for the Spot interface. Referring also to FIG. 1, the quadrant system menu 50 is accessed by clicking the mouse 24 when the mouse pointer 26 is over a menu icon 51. The quadrant system menu 50 includes a menu pick for the SPOT interface, labeled "Spot" 52 and menu picks for the Works application, labeled "Edit" 54, "View" 56, "Insert" 58, "Format" 60, "Tools" 62, and "Help" 64. Each of the menu picks 52–64 may have a pop-up sub-menu associated with it. For example, the Format menu pick 60 has a pop-up sub-menu 60a associated therewith. The quadrant system menu 50 replaces the conventional horizontal pull-down main menu typically associated with the Works application, and requires less room, thereby maintaining the unobtrusive nature of the SPOT interface. The features of the quadrant 14 discussed above are provided by software instructions and subroutine calls, described in greater detail below.

FIGS. 4–12 illustrate software instructions and subroutine calls of the preferred embodiment of the present invention that are incorporated into the SPOT interface running on the Windows95 GUI and utilizing the OLE service. As a result, many of the subroutine calls made in the following figures are Windows-specific or OLE-specific calls and would be obvious to one of ordinary skill in the art. Furthermore, to convert the preferred embodiment into another user interface or another GUI, one of ordinary skill in the art can readily translate the Windows-specific and OLE-specific calls to subroutine calls appropriate for the GUI being used. Therefore, the following description is intended only to illustrate one embodiment of the present invention in such a manner that the unique features of the invention can be readily transported to other GUIs, and as a result, should not be interpreted as a limitation of the invention.

FIGS. 4–9 describe a method for creating a quadrant size and location that displays items such as the controls 43, 44 along with the object 15 inside the quadrant 14, when the object 15 is in the active mode. The present invention must supply room for all of the items inside the quadrant 14, but outside the client area 41. Initially, the OLE service is notified that it may use an arbitrarily large space for the items. After the OLE service has created the items, the present invention resizes the quadrant 14 to provide the minimum amount of space while still showing all of the items, as illustrated in FIG. 2. When the object 15 goes back to the inactive mode, the quadrant 14 is restored to its original size, as generated by the OLE service.

Figure 10:
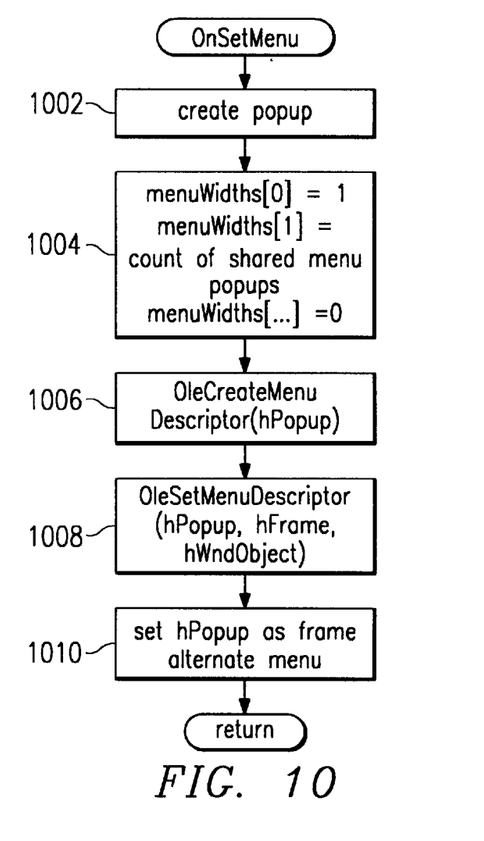
FIG. 10 is a flowchart of the operation of a OnSetMenu subroutine of the present invention.
Figure 11:
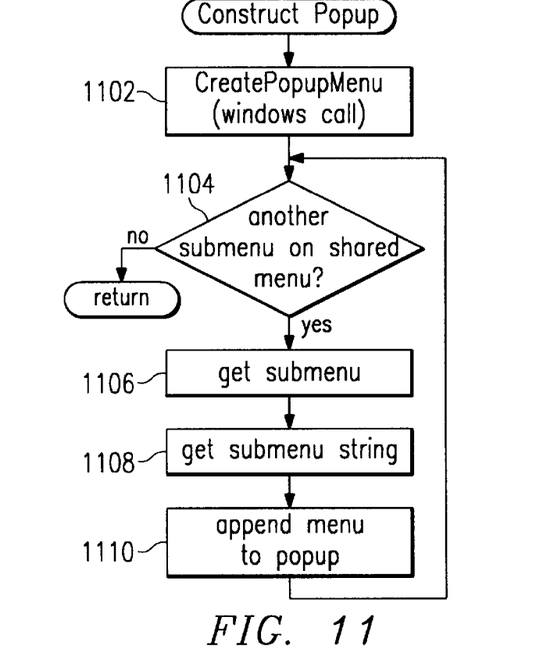
FIG. 11 is a flowchart of the operation of a Construct-Popup subroutine of the present invention.
Figure 12:
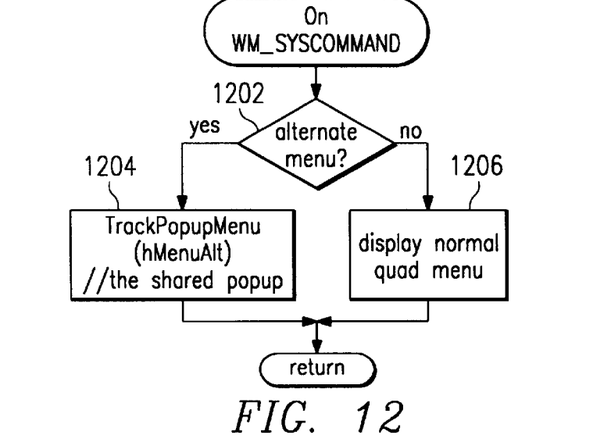
FIG. 12 is a flowchart of the operation of a WM_SYSCOMMAND subroutine of the present invention.

FIGS. 10–12 describe a method for creating pop-up menus that are shared by the server application and the SPOT interface. The present invention first generates the quadrant system menu 50, and then passes the menu to the OLE service. The OLE service attaches menu items from the server application. Finally, a standard Windows-specific command is created to substitute the quadrant system menu 50 as the standard menu, as illustrated in FIG. 3.

Figure 4:
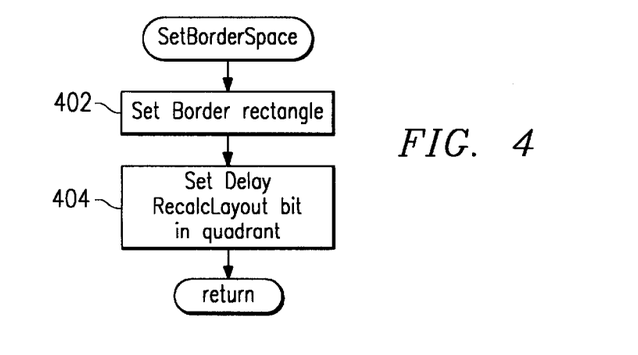
FIG. 4 is a flowchart of the operation of a SetBorderSpace subroutine of the present invention.

Referring to FIG. 4, the SPOT interface, as improved by the present invention, includes functionality to set the client window 41 for the embedded object 15, as defined by the OLE service. A subroutine entitled SetBorderSpace presents a first portion of exemplary logic for determining a border space between the client window 41 and the frame 38. The SetBorderSpace subroutine is a standard interface for the OLE service. The goal of SetBorderSpace subroutine is to allow the object 15 to be moved and resized with sufficient border space so that the controls 43, 44, as well as the hatch window 46, are visible within the quadrant area 34, when the object is in the active mode. At step 402, in response to the OLE service's request for an amount of space available for the object 14, a SetBorderRectangle subroutine responds with rectangle coordinates that are at a maximum. At step 404, a RecalcLayout bit for quadrant 34 is set so that the next time the processor 20 enters an idle mode, the size of the client window will be calculated.

Figure 5:
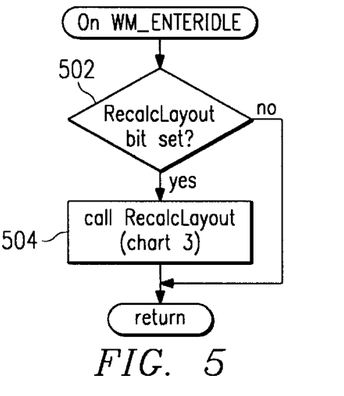
FIG. 5 is a flowchart of the operation of a WM_ENTERIDLE subroutine of the present invention.

Referring to FIG. 5, the subroutine WM_ENTERIDLE 500 performs the recalculation of the client window size. The Windows application calls the WM_ENTERIDLE subroutine whenever the processor 20 enters the idle mode. At this time, the OLE service has already created all the controls 43, 44, adornments 48, and hatch window 46 for the object 15. At step 502, the RecalcLayout bit is checked to determine whether the Windows application should recalculate the size of the client window 41. If the RecalcLayout bit is not set, the subroutine returns to the idle mode. If the RecalcLayout bit is set, execution proceeds to step 504 where a RecalcLayout subroutine (FIG. 6) is called. The RecalcLayout subroutine calculates a client window 41 size to accommodate the object 15, according to the specifications from the OLE service, and adds the border 48. As a result, the size of frame 38 is increased and offset for the client window, as discussed in greater detail with reference to FIGS. 6–8.

Figure 6:
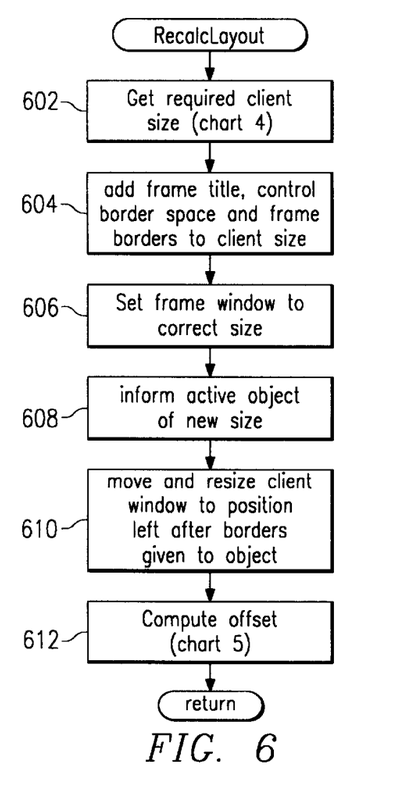
FIG. 6 is a flowchart of the operation of a RecalcLayout subroutine of the present invention.

Referring to FIG. 6, the RecalcLayout subroutine manipulates standard OLE and Windows subroutines to provide the appropriate client window size for the SPOT interface. At step 602, a GetRequiredClientSize (FIG. 7) subroutine is called. The GetRequiredClientSize subroutine interfaces with OLE service to determine the basics for the client window 41 size, as required by the SPOT interface. The GetRequiredClientSize subroutine returns a height and width, size.x and size.y, respectively, as discussed in greater detail with reference to FIG. 7.

Referring still to FIG. 6, at step 604, the height and width are adjusted to include the adornments 48 including the row and column headings and the vertical and horizontal scroll bars, as well as the title bar 40. At step 606, the frame size for the client window is set so that everything fits precisely inside the frame 38. At step 608, the frame size for the object 15 is updated. At step 610, the client window 41 is moved and resized to fit appropriately next to the SPOT GDE 10. This includes space for the borders, which were set at step 402 (FIG. 4). At step 612, a ComputeOffset subroutine (FIG. 8) is called to determine the amount of offset required if the object is in the active mode, as discussed in greater detail with reference to FIG. 8.

Figure 7:
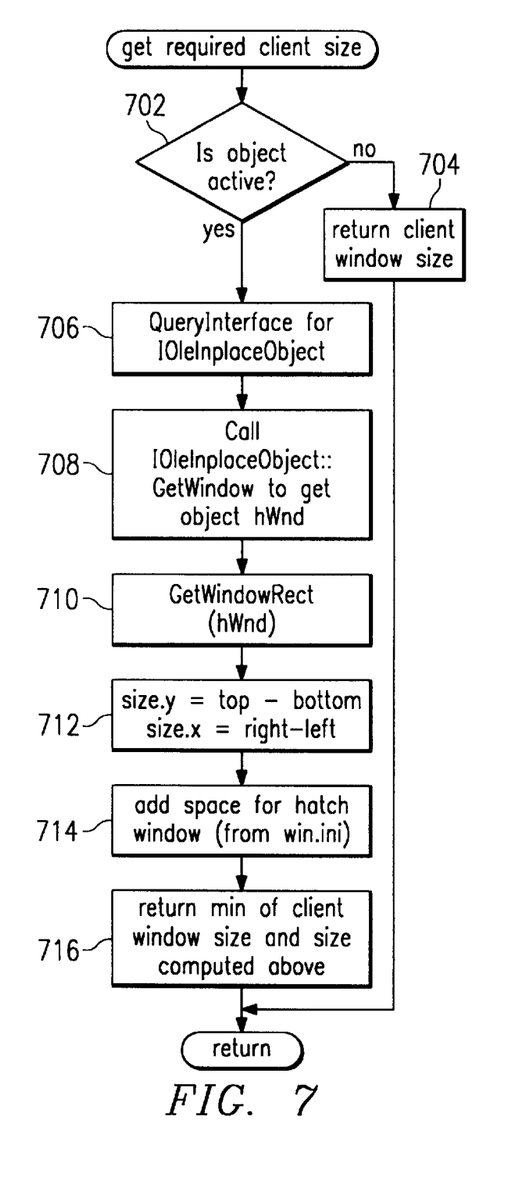
FIG. 7 is a flowchart of the operation of a GetRequired-ClientSize subroutine of the present invention.

Referring to FIG. 7, the GetRequiredClientSize subroutine is used to calculate the size for the frame 38, which is not provided by the OLE service. The size for the frame 38 accommodates the object 15, the hatch window 46 and the controls 43, 44. The standard frame size conventionally provided by the OLE service does not include space for the controls 43, 44 because the OLE service typically changes the tool bars and information bar of the container application. Execution of the GetRequiredClientSize subroutine begins at step 702, where a determination is made whether the object 15 is in the active mode. If the object 15 is in the inactive mode (FIG. 1), execution proceeds to step 704, which returns the standard frame size, as determined by the OLE service.

If at step 702 the object 15 is in active mode, execution proceeds to step 706. At step 706, a subroutine is called to query the OLE service for the object. At step 708, a subroutine QueryInterface is called to prompt the OLE service for coordinates identifying the window size for the object 15 to determine how big the client window should be. At step 710, the client window's rectangle coordinates are received from the Windows application. At step 712, the frame size of the client window 41 is determined from the window size coordinates, e.g. the height of the window, size.y, is equal to the coordinates for the top minus the coordinates for the bottom, and the width of the window, size.x, is equal to the coordinates of the right minus the coordinates for the left.

Figure 8:
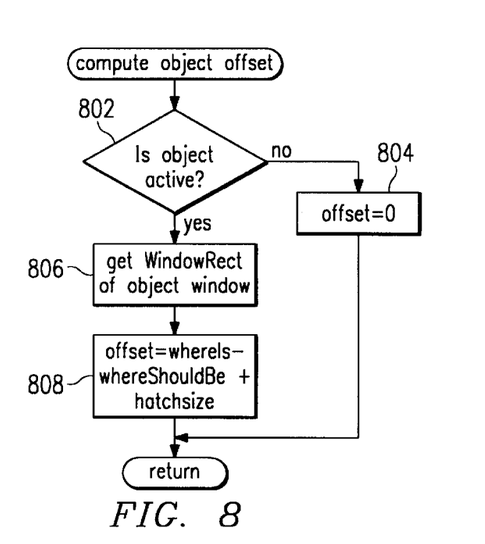
FIG. 8 is a flowchart of the operation of a ComputeObjectOffset subroutine of the present invention.

Referring to FIG. 8, execution of the ComputeObjectOffset subroutine begins at step 802 where a determination is made whether the object 15 is in the active mode. If the object 15 is not in the active mode, execution proceeds to step 804 and no offset is added. If in step 802, the object 15 is in the active mode, execution proceeds to step 806. At step 806, the Windows interface is called to get the values for the rectangle coordinates for the object window 41 of where the OLE service is attempting to place the object 15. At step 808, the offset is set equal to the difference of where the OLE service is attempting to put the object 15 and where the SPOT interface wants to put the object, taking into account the size of the hatch window 46.

Figure 9:
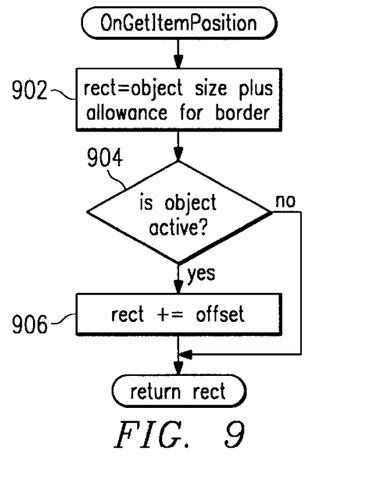
FIG. 9 is a flowchart of the operation of a OnGetItem-Position subroutine of the present invention.

Referring to FIG. 9, an OnGetItemPosition subroutine is called as part of the GetWindowContext subroutine of the OLE service to move the object 15 so that all the adornments 48, as well as the hatch window 46, fit into the client window 41. Execution begins at step 902, which sets a variable RECT to equal the object size plus the a small border around the object. At step 904, a determination is made if the object 15 is in the active mode. If the object is not in the active mode, execution returns the value of RECT as set above. Otherwise, an ORIGIN value of the variable RECT is adjusted by the offset calculated in FIG. 8, thereby moving the client window 41 to include the space for the hatch window 46 and the adornments 48.

Referring to FIG. 10, an OnSetMenu subroutine is called to implement the OLE service menu-setting functions. The OnSetMenu subroutine modifies the set menu functions because the OLE service is programmed to build horizontal menus, while the SPOT interface utilizes pop-up menus. At step 1002, the quadrant system menu 50 is created as a standard pop-up window using a standard Windows subroutine. At step 1004, widths of individual menu groups are set. In the preferred embodiment, the first menu group, which comprises the SPOT sub-menu 52 has a width of "1". The second group, which comprises the remaining sub-menus Edit 54, View 56, Insert 58, Format 60, Tools 62, and Help 64, has a width of "6". The remaining groups, which are unused by the preferred embodiment, have a width of "0." In this way, the OLE service is notified which sub-menus it needs to update. The SPOT sub-menu 52 is used to access features of the SPOT interface. The remaining sub-menu groups 54–64 are associated with the server application, which in the example illustrated in FIG. 3, is a Works application program.

At step 1006, an OleCreateMenu routine is called to return descriptors for the remaining menus 54–62. At step 1008, an OleSetMenuDescriptor routine is called to set the quadrant system menu 50, as well as the size for the client window 41 and the frame 38. At step 1010, an alternate_menu handle is set, thereby activating the quadrant system menu 50 instead of the Spot pop-up menu 52. Although the quadrant system menu 50 is a pop-up window instead of a conventional horizontal window, the OLE service will still properly service the menu, as discussed in greater detail below.

Referring to FIG. 11, a ConstructPopup subroutine is called to construct the quadrant system menu 50 shared by the SPOT interface and the server application. At step 1102, a CreatePopupMenu routine, which is a standard Windows routine, is called. Steps 1106 through 1110 then add each sub-menu, one at a time. At step 1104, a determination is made whether additional sub-menus exist. If they do exist, execution proceeds to step 1106–1110, which gets the next sub-menu and appends it to the quadrant system menu 50. Execution then returns to step 1104 and the next sub-menu is addressed, until there are no more sub-menus.

Referring to FIG. 12, the Windows application sends a WM_SYSCOMMAND subroutine call to itself whenever the quadrant menu icon 51 is accessed. At step 1202, a determination is made whether the alternate_menu handle, which was set at step 1010 of FIG. 10, is set. If the alternate_menu handle is set, execution proceeds to step 1204, in which a TrackPopupMenu routine is called. The TrackPopupMenu routine activates the quadrant system menu 50 for the SPOT interface. If, in step 1202 the alternate_menu handle is not set, as in the case of a request for the quadrant system menu 50, execution proceeds to step 1206, in which a normal, quadrant menu is displayed.

In this manner, the SPOT interface provides unlimited extension of the SPOT interface while still maintaining the design goals of the SPOT interface. Because any object that conforms to the OLE service's specifications may be placed in one of the SPOT interface quadrants, the present invention may be extended in many different manners. For example, a stock market "quote" application program may provide an object that displays continuously updated stock information.

It is understood that the present invention can take many forms and embodiments, the embodiments shown herein are intended to illustrate rather than limit, the invention, it being understood that variations may be made without departing from the spirit of the scope of the invention. For example, the controls such as the tool bar may be placed above the quadrant 14 so that the object 15 remains stationary when transitioning between the active and inactive modes.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a graphical user interface with a graphical display element and a container with a frame, and object linking and embedding capabilities, a computer program enabling an object from a first application program to be linked or embedded into the container, the object comprising controls and adornments the computer program comprising:

instructions for determining a size of an object that is linked or embedded into a container having an adjustable frame, the object comprising information content;

instructions for determining whether the object is in an active mode;

instructions for determining a first frame size for the adjustable frame so that the adjustable frame fits tightly around an inactive-mode visual appearance of the information content if the object is not in the active mode; and instructions for determining a second frame size for the adjustable frame so that the adjustable frame fits tightly around an active-mode visual appearance of the information content while including controls and adornments of the object if the object is in the active mode.

2. The computer program of claim 1 wherein the container remains in a constant positional relationship with the graphical display element when switching between the active mode and the inactive mode.

3. The computer program of claim 1 further comprising:
instructions for generating a pop-up menu with a plurality of submenus similar to submenus of a conventional horizontal menu.

4. The computer program of claim 3 wherein the pop-up menus include menu items of the first application program.

5. The computer program of claim 4 wherein the pop-up menus also include menu items of the graphical user interface.

6. The computer program of claim 3 wherein the pop-up menus include menu items of the first application program and menu items of the graphical user interface.

7. The computer program of claim 1, wherein the instructions for determining the first frame size and second frame size comprise:
instructions for determining a available frame size;
instructions for informing the object that the object may utilize the desired frame size;
instructions for receiving from the object a requested frame size; and
instructions for determining the first frame size or the second frame size, respectively, after receiving the requested frame size.

8. The computer program of claim 1 further comprising instructions for enabling a user to drop the object from the first application into the graphical user interface.

9. In a computer comprising a graphical user interface with a graphical display element and a container with a frame, and object linking and embedding capabilities, a computer program enabling an object from a first application program to be linked or embedded into the container, the object comprising controls and adornments, the computer program comprising:
instructions for determining a size of the object;
instructions for determining whether the object is in an active mode;
instructions for determining a first frame size so that the frame fits tightly around the object if the object is not in the active mode; and
instructions for determining a second frame size so that the frame fits tightly around the object while including the object's controls and adornments if the object is in the active mode, said instructions for determining the first frame size and second frame size comprising:
instructions for determining an arbitrarily large frame size;
instructions for informing the object that the object may utilize the arbitrarily large frame size;
instructions for receiving from the object a requested frame size; and
instructions for determining the first frame size or second frame size, respectively, after receiving the requested frame size.

10. In a computer comprising a graphical user interface with a graphical display element, a method for enabling a object to be linked or embedded from a first application program into a container with a frame, the method comprising the steps of:
linking or embedding an object from a first application program to a container having an adjustable frame, the object comprising controls and adornments;
determining a size of the object;
determining whether the object is in an active mode or an inactive mode;
if the object is in the inactive mode, determining a first frame size for an adjustable frame so that the adjustable frame fits tightly around a first visual representation of the object while including the object's controls and adornments; and
if the object is in the active mode, determining a second frame size for the adjustable frame so that the adjustable frame fits tightly around a second visual representation of the object while including the object's controls.

11. The method of claim 10 further comprising:
generating pop-up menus associated with the object if the container does not include horizontal menus.

12. The method of claim 11 wherein the pop-up menus include menu items of the first application program.

13. The method of claim 12 wherein the pop-up menus also include menu items of the graphical user interface.

14. The method of claim 10 wherein the container remains in a constant positional relationship with the graphical display element in either the active mode or the inactive mode.

15. The method of claim 11 wherein the pop-up menus include menu items of the first application program and menu items of the graphical user interface.

16. The method of claim 10 further comprising enabling a user to drop the object from the first application into the graphical user interface.

17. In a computer comprising a graphical user interface with a graphical display element and a container with a frame, the computer capable of linking or embedding an object from a first application program to a second application program, the object comprising controls and adornments, a method for enabling the object to be linked or embedded from the first application program into the graphical user interface, the method comprising:
determining a size of the object;
determining whether the object is in an active mode or an inactive mode;
if the object is in the inactive mode, determining a first frame size so that the frame fits tightly around the object while including the object's controls and adornments; and
if the object is in the active mode, determining a second frame size so that the frame fits tightly around the object while including the object's controls, wherein the steps for determining the first frame size and second frame size comprise:
determining an arbitrary large frame size;
informing the object that the object may utilize the arbitrary large frame size;
receiving from the object a requested frame size; and
determining the first frame size or second frame size, respectively, after receiving the requested frame size.

18. In a computer comprising a Spot-type graphical user interface with a graphical display element and at least one container with a frame, a computer program stored on a computer-readable medium and working with an OLE-type program, the computer program enabling an object from a first application program, along with controls and adornments as provided, to be linked or embedded into the container of the graphical user interface, the computer program comprising:
instructions for determining a size of the object;

instructions for determining whether the object is in an active mode or an inactive mode;

instructions for determining an arbitrarily large frame size;

instructions for informing the object that the object may utilize the arbitrarily large frame size;

if the object is in the inactive mode, instructions for receiving from the object a requested size and determining a first frame size for the container frame so that the frame fits tightly around the object as well as the object's controls and adornments;

if the object is in an active mode, instructions for receiving from the object the requested size and determining a second frame size for the container if the object so that the frame fits tightly around the object while including the object's controls;

instructions for providing a first object window size and location if the object is in the inactive mode;

instructions for providing a second object window size and location if the object is in the active mode.

19. The computer program of claim 18 further comprising:

instructions for generating pop-up menus associated with the object if the container does not include horizontal menus, wherein the pop-up menus include menu items of the first application program and menu items of the graphical user interface.

20. A computer program comprising:

a memory; and a computer program loaded into the memory, the computer program configured to:

determine a size of an object that is linked or embedded into a container having an adjustable frame;

determine whether the object is in an active mode;

if the object is not in the inactive mode, determine a first frame size for a first adjustable frame so that the first adjustable frame encloses a visual rendering of the object; and if the object is in the active mode, determine a second frame size for a second adjustable frame so that the second adjustable frame encloses a visual rendering of the object and associated controls and adornments.

21. The computer system of claim 20, further comprising a Spot-type graphical user interface with a graphical display element and at least one container with a frame.

22. The computer program of claim 21, wherein the computer program enables the object from a first application program, along with any associated controls and adornments, to be linked or embedded into the container of the graphical user interface.

23. The computer program of claim 22, further configured to enable a user to drop the object from the first application program into the graphical user interface.

24. The computer program of claim 20, wherein the computer program is stored on a computer-readable medium and the computer program works with an OLE-type program.

25. The computer program of claim 20, further configured to:

provide a first client window size and a first client window location if the object is not in the active mode; and provide a second client window size and a second client window location if the object is in the active mode.

26. The computer program of claim 25, wherein a container remains in a constant positional relationship with respect to a graphical display element when switching between the active mode and the inactive mode.

27. The computer program of claim 20, further configured to:

generate a pop-up menu.

28. The computer program of claim 27, wherein the pop-up menus include menu items of a first application program.

29. The computer program of claim 28, wherein the pop-up menus also include menu items of a Spot-type graphical user interface.

30. The computer program of claim 20, further configured to:

determine a maximum frame size;

inform the object that the object may utilize the maximum frame size;

receive from the object a requested size; and determine the first frame size or the second frame size, respectively, after receiving the requested size.

31. The computer program of claim 27, wherein the pop-up menus include menu items of a first application program and menu items of a Spot-type graphical user interface.

* * * * *

UNITED STATES PATENT AND TRADEMARK OFFICE
CERTIFICATE OF CORRECTION

PATENT NO. : 5,838,321
DATED : November 17, 1998
INVENTOR(S) : Richard J. Wolf

Page 1 of 1

It is certified that error appears in the above-identified patent and that said Letters Patent is hereby corrected as shown below:

Column 8,
Line 53, change "adornments the" to -- adornments, the --.

Signed and Sealed this

Second Day of October, 2001

Attest:

*Nicholas P. Godici*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

| | |
|---|---|
| PATENT NO. | : 5,838,321 |
| APPLICATION NO. | : 08/643577 |
| DATED | : November 17, 1998 |
| INVENTOR(S) | : Richard J. Wolf |

It is certified that error appears in the above-identified patent and that said Letters Patent is hereby corrected as shown below:

<u>Column 11,</u>

Line 37, change "if the object is not in the inactive mode" to -- if the object is not in the active mode --

Signed and Sealed this

Thirtieth Day of December, 2008

JON W. DUDAS
*Director of the United States Patent and Trademark Office*